United States Patent
Sun et al.

(10) Patent No.: US 6,644,685 B2
(45) Date of Patent: Nov. 11, 2003

(54) SEAMLESS PASSENGER SIDE AIRBAG DOOR

(75) Inventors: Esther M. Sun, Novi, MI (US); James D. Pink, Sterling Heights, MI (US); Sirish Mishra, Troy, MI (US); Anna H. Cardenas, Allen Park, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 125 days.

(21) Appl. No.: 09/948,868

(22) Filed: Sep. 7, 2001

(65) Prior Publication Data

US 2003/0047916 A1 Mar. 13, 2003

(51) Int. Cl.$^7$ ............................................. B60R 21/20
(52) U.S. Cl. ................. 280/728.3; 280/728.2; 280/732
(58) Field of Search ................. 280/728.2, 728.3, 280/732

(56) References Cited

U.S. PATENT DOCUMENTS

| | | | |
|---|---|---|---|
| 4,895,389 A | 1/1990 | Pack, Jr. | |
| 5,280,947 A | 1/1994 | Cooper | |
| 5,316,335 A | 5/1994 | Gray et al. | |
| 5,342,085 A | * 8/1994 | Hirashima et al. | 280/728.3 |
| 5,372,379 A | 12/1994 | Parker | |
| 5,393,088 A | 2/1995 | Bauer et al. | |
| 5,393,089 A | 2/1995 | Pakulsky et al. | |
| 5,403,033 A | 4/1995 | Koma | |
| 5,435,596 A | 7/1995 | Rose et al. | |
| 5,437,469 A | 8/1995 | Monden | |
| 5,456,487 A | 10/1995 | Daris et al. | |
| 5,460,402 A | 10/1995 | Rhodes, Jr. | |
| 5,498,027 A | 3/1996 | Kelley et al. | |
| 5,531,471 A | 7/1996 | Terai | |
| 5,560,646 A | * 10/1996 | Gray et al. | 280/728.3 |
| 5,564,731 A | 10/1996 | Gallagher et al. | |
| 5,580,081 A | 12/1996 | Berg et al. | |
| 5,775,727 A | 7/1998 | Sun et al. | |
| 5,797,619 A | * 8/1998 | Bauer et al. | 280/728.3 |
| 5,803,487 A | * 9/1998 | Kikuchi et al. | 280/728.2 |
| 5,803,489 A | 9/1998 | Nusshör | |
| 5,810,388 A | 9/1998 | Berardi et al. | |
| 5,816,609 A | 10/1998 | Gray et al. | |
| 5,845,931 A | * 12/1998 | Nagy et al. | 287/728.3 |
| 5,863,062 A | * 1/1999 | Harada et al. | 280/728.3 |
| 5,941,558 A | 8/1999 | Labrie et al. | |
| 5,961,142 A | * 10/1999 | Shiraki et al. | 280/728.3 |
| 5,997,030 A | 12/1999 | Hannert et al. | |
| 6,045,153 A | 4/2000 | Sommer et al. | |
| 6,070,901 A | 6/2000 | Hazell et al. | |
| 6,076,851 A | 6/2000 | Davis, Jr. et al. | |
| 6,092,835 A | 7/2000 | Thakore et al. | |
| 6,109,645 A | 8/2000 | Totani et al. | |
| 6,113,131 A | * 9/2000 | Uehara et al. | 280/728.3 |
| 6,145,871 A | 11/2000 | Davis, Jr. et al. | |
| 6,250,669 B1 | * 6/2001 | Ohmiya | 280/732 |
| 6,318,752 B1 | 11/2001 | Warnecke et al. | |
| 6,457,738 B1 | * 10/2002 | Labrie et al. | 280/728.3 |
| 6,457,739 B1 | * 10/2002 | Dailey et al. | 280/728.3 |

(List continued on next page.)

FOREIGN PATENT DOCUMENTS

| | | |
|---|---|---|
| JP | 5-185896 | 7/1993 |
| JP | 10-44910 | 2/1998 |
| WO | WO 02/47943 | 6/2002 |

*Primary Examiner*—Paul N. Dickson
*Assistant Examiner*—Toan C To
(74) *Attorney, Agent, or Firm*—Brinks Hofer Gilson & Lione

(57) ABSTRACT

An instrument panel for an automobile passenger compartment includes a substrate having an interior surface, an exterior surface, and an opening therein. A ridge is molded into and extends from the interior surface and around the opening to provide a deployment chute for an airbag. A door panel adapted to cover the opening is pivotally connected to the exterior surface and includes an upstanding flange.

12 Claims, 4 Drawing Sheets

U.S. PATENT DOCUMENTS

| | | |
|---|---|---|
| 6,460,876 B1 | 10/2002 | Nishijima |
| 6,460,880 B1 * | 10/2002 | Gallagher et al. .......... 280/732 |
| 2001/0045728 A1 | 11/2001 | Kansteiner et al. |
| 2002/0003343 A1 | 1/2002 | Kansteiner |
| 2002/0005630 A1 | 1/2002 | Suzuki et al. |
| 2002/0008368 A1 | 1/2002 | Kurimoto |
| 2002/0043788 A1 | 4/2002 | Gallagher et al. |

* cited by examiner ated with the opening 14 and an open position where the door panel 24 is pivoted about the hinge portion 33 outward and upward from the opening 14.

SEAMLESS PASSENGER SIDE AIRBAG DOOR

TECHNICAL FIELD OF THE INVENTION

This patent discloses and claims a useful, novel, and unobvious invention for an automobile instrument panel, including an air bag device and a seamless outer cover.

BACKGROUND

One issue that has recently been a concern with air bag devices installed in automobiles is that the air bag must preserve the aesthetic appeal of the automobile, but at the same time, deploy outward through the instrument panel with minimal interference. In an instrument panel, the air bag must be able to break through the instrument panel, but the instrument panel itself must be structurally sound and resistant to inadvertent fracturing at or near the point where the air bag is meant to deploy. For this reason, there is a need in the industry for improvements to air bag doors in a foam-in-place instrument panel.

SUMMARY OF THE INVENTION

In accordance with an aspect of the present invention, an instrument panel for an automobile passenger compartment comprises a substrate including an interior surface, an exterior surface, and an opening extending therethrough. Ribs that extend around the opening are molded into and extend from the interior surface adjacent to the opening. A door panel which is adapted to cover the opening, is pivotally connected to the exterior surface and includes an upstanding flange. Adhesive tape is affixed to the door panel and to portions of the exterior surface to secure the door panel in a closed position and to form a sealed engagement between a periphery of the door panel and the substrate.

DETAILED DESCRIPTION OF THE PREFERRED EMBODIMENT

The following description of the preferred embodiments of the invention is not intended to limit the scope of the invention to these preferred embodiments, but rather to enable any person skilled in the art to make and use the invention. Referring to the Figures, wherein like numerals indicate like or corresponding parts throughout the several views, an instrument panel for an automobile passenger compartment is shown generally at 10.

Figure 1:
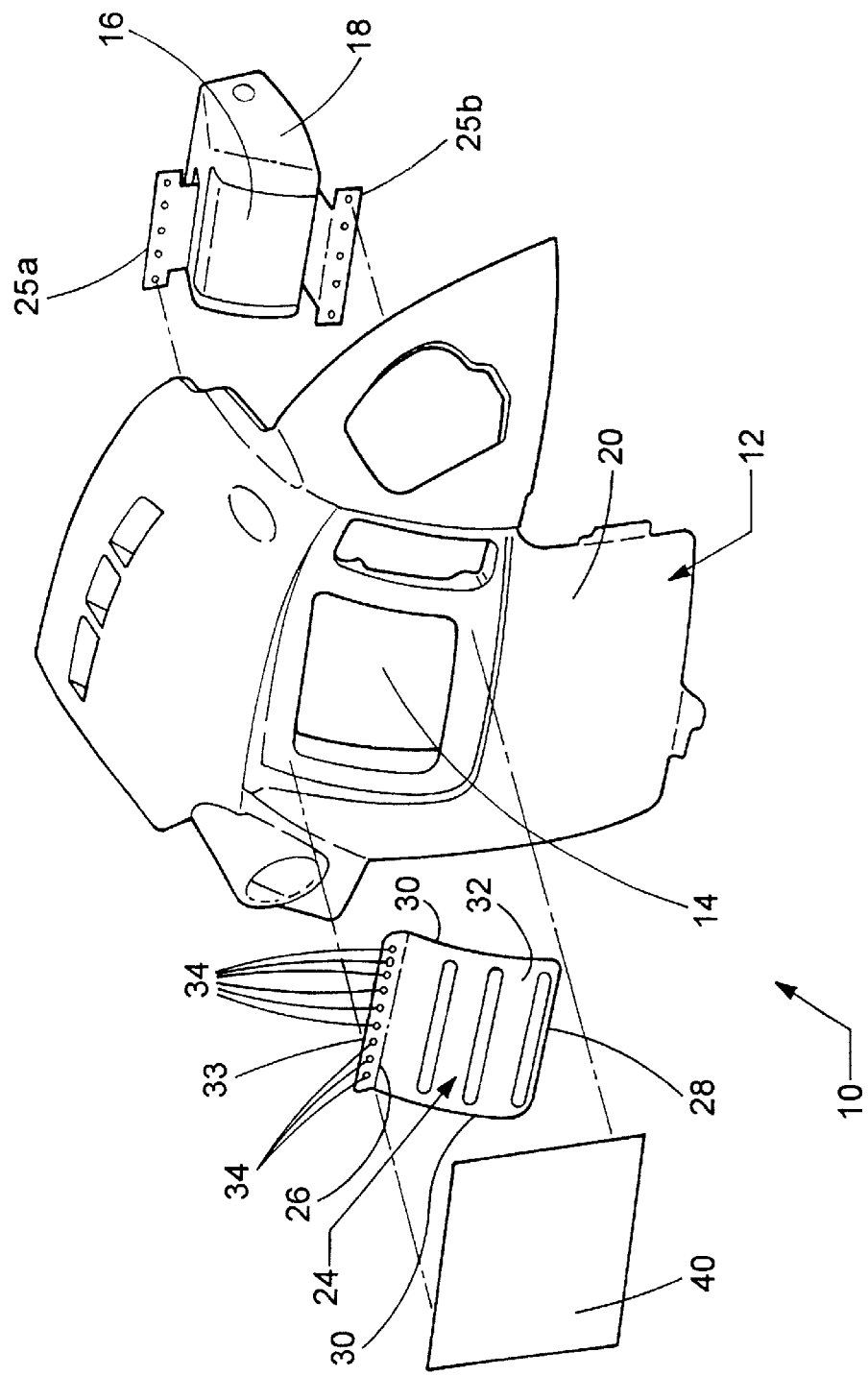
FIG. 1 is an exploded view of a first preferred embodiment of an instrument panel of the present invention.
Figure 2:
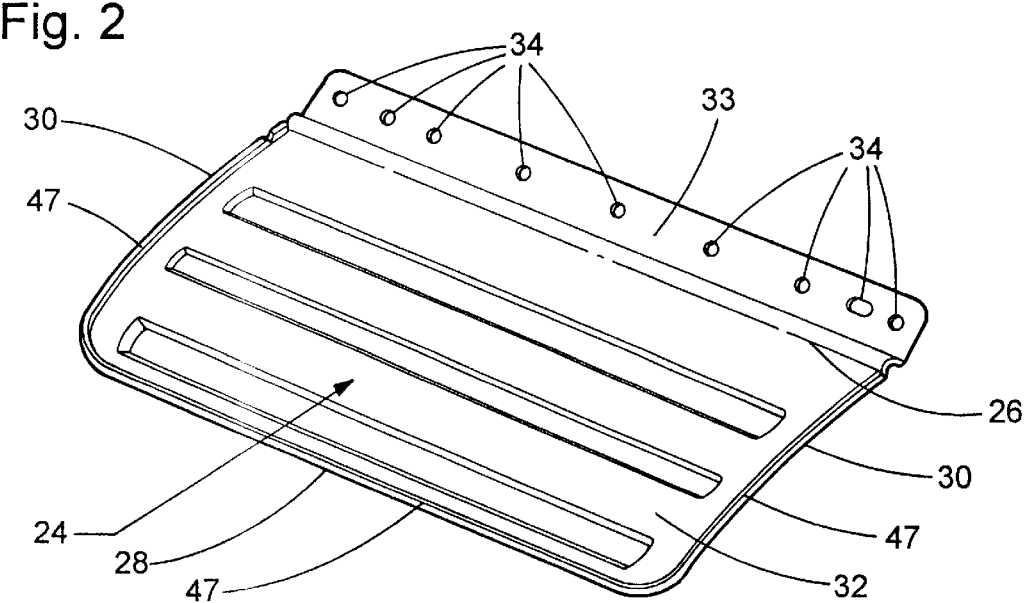
FIG. 2 is a perspective view of a panel door for the instrument panel of the present invention.
Figure 3:
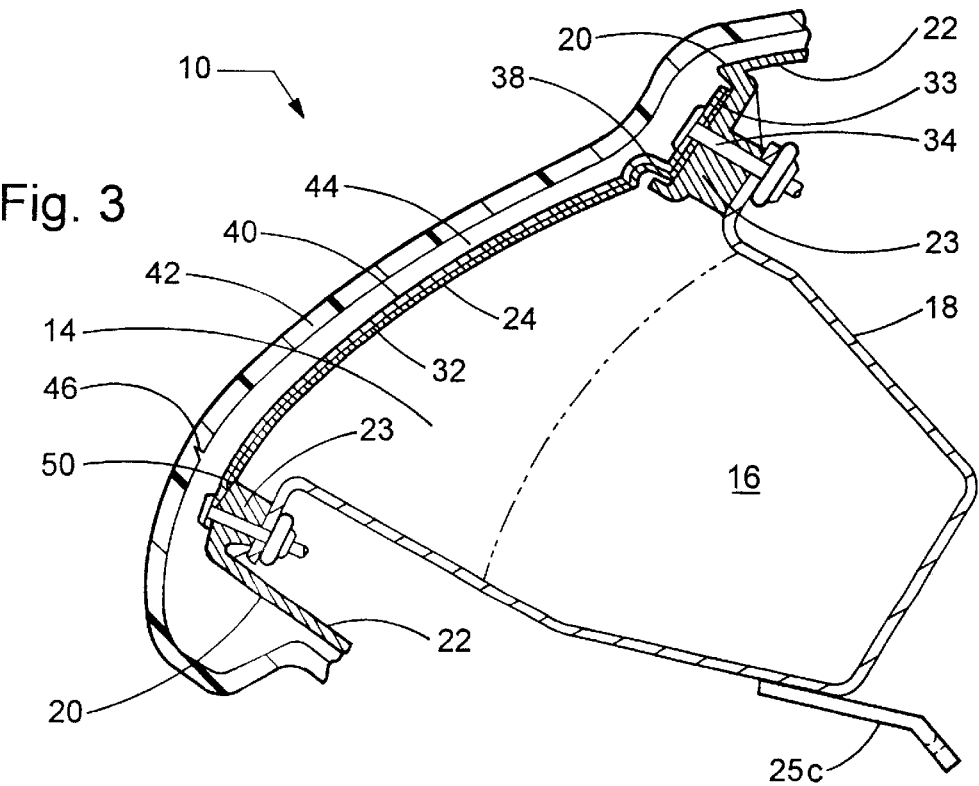
FIG. 3 is a cross-sectional view of the instrument panel shown in FIG. 1.

Referring to FIGS. 1 through 3, the instrument panel 10 includes a substrate 12 that forms the underlying structure for the instrument panel 10. The substrate 12 can be made from any suitable rigid material, however in the preferred embodiment, the substrate 12 is formed from plastic. The substrate 12 includes an opening 14 which is sized to allow an air bag 16 to deploy through the substrate 12. The air bag 16 is mounted within a module 18 which houses the airbag 16 and the air bag components. The substrate 12 includes an exterior surface 20, and an interior surface 22 wherein the interior surface 22 of the substrate 12 faces away from the interior of the automobile. The substrate further includes a molded-in ridge 23 extending inward from the interior surface 22. The molded-in ridge 23 extends around the opening 14 within the substrate 12, and provides a channel for deployment of the air bag 16. Typically, an instrument panel includes a chute (not shown) mounted to the interior surface 22 of the substrate 12 to provide a channel to guide the deployment of the air bag 16, however the molded-in ridge 23 of the present invention serves that purpose and allows the instrument panel 10 to be equipped with an air bag 16 without using a chute. Additionally, the molded-in ridge 23 provides molded-in bosses 23*a* which are adapted to support the air bag 16. The molded-in ridge 23 is preferably formed from the same material as the other portions of the substrate 12. Preferably, the molded-in ridge 23 is molded along with the substrate 12 and the substrate and the molded-in ridge are one piece.

The air bag module 18 is generally box shaped with side walls, a rear wall, and a front opening defined by the side walls. The air bag module 18 is mounted to the interior surface 22 of the substrate 12 such that the front opening of the module 18 is aligned with the opening 14 in the substrate 12. When the air bag 16 is deployed, the air bag 16 rapidly expands outward through the front opening in the module 18 and the opening 14 in the substrate 12 outward into the interior of the vehicle. The air bag includes a plurality of brackets 25 extending from the side walls. The brackets 25 include apertures adapted to allow the air bag module 18 to be attached to the interior surface 22 of the substrate 12. The air bag module 18 could include any appropriate number of brackets 25, however, in the preferred embodiment, the air bag module 18 includes a top mounting bracket 25*a* on a top side wall, and a bottom mounting bracket 25*b* on a bottom side wall.

Additionally, the air bag module 18 includes a rear mounting bracket 25*c* extending from the rear wall to allow the air bag module 18 to be attached to a support structure of the vehicle. This allows the instrument panel 10 to be attached to the support structure of the vehicle through the air bag module 18. Additionally, the brackets 25*a*, 25*b*, 25*c* mounted to the air bag module 18 extend forward from the air bag module 18. The presence of the molded in ridge 23 and the extended brackets 25*a*, 25*b* act as a deployment channel for the air bag 16, thereby eliminating the need for a chute as described above.

The instrument panel 10 also includes a door panel 24 for covering the opening 14 within the substrate 12. The door panel 24 is generally the same shape as the opening 14 within the substrate 12 such that the door panel 24 completely covers the opening 14 when in place. Preferably, the door panel 24 includes a door portion 32 and a hinge portion 33. Preferably, the door portion 32 is generally rectangular with a top edge 26, a bottom edge 28 and two side edges 30. Preferably the top edge 26 of the door portion 32 is pivotally connected to the hinge portion 33 to allow pivotal movement of the door portion 32 with respect to the hinge portion 33. The hinge portion 33 preferably includes apertures 34 for receiving fasteners to secure the door panel 24 to the substrate 12. It is to be understood however, that the door panel 24 could be secured to the substrate 12 by other appropriate methods. The door panel 24 pivots between a closed position, where the door panel 24 is resting aligned with the substrate 12 and the opening 14 within the substrate 12 is covered, and an open position, where the door panel 24 is pivoted outward away from the substrate 12, thereby leaving the opening 14 within the substrate 12 uncovered.

The door portion 32 can be attached to the hinge portion 33 by any pivotal means, however, in the preferred embodiment, the hinge portion 33 and the door portion 32 are formed from a single piece of stamped metal, preferably steel. When the door portion 32 pivots from the closed position to the open position, the single stamped piece of steel bends at a point between the door portion 32 and the hinge portion 33. Preferably, the single piece stamping includes a contour lip 38 between the door portion 32 and the hinge portion 33 to provide a pre-determined crease line to allow pivotal movement of the door portion 32 in relation to the substrate 12.

Preferably, the instrument panel 10 includes adhesive tape 40 affixed to the door panel 24 and to the substrate 12 to keep the door panel 24 in the closed position. The adhesive tape 40 covers the door panel 24 and extends onto portions of the substrate 12 for securing the door panel 24 in the closed position. The adhesive tape 40 also serves a second function by providing a sealed engagement between the edges 26, 28, 30 of the door panel 24 and the substrate 12. Preferably, a plurality of strips of adhesive tape are used, however, it is to be understood, that a single sheet of adhesive tape could also be used.

In the preferred embodiment, an outer skin 42 extends over the entire substrate 12 to conceal the substrate 12 and provide an aesthetically pleasing appearance to the interior of the vehicle. Also in the preferred embodiment, a foam 44 fills in between the outer skin 42 and the substrate 12 to support the outer skin 42 and to provide padding between the outer skin 42 and the substrate 12. The outer skin 42 can be formed from any suitable flexible plastic such as PVC (polyvinyl chloride), thermoplastic urethane, ABS (acrylonitile-butadiene-styrene), TPO (thermoplastic olefins), ASA (acrylonitrile-styrene-acrylic), or blended elastomeric thermoplastic polymers and polyolefins. The foam 44 can be made from any suitable material such as polyurethane, PVC (polyvinyl chloride), polyethylene or polypropylene. The exact material used for the outer skin 42 and the foam 44 will depend on the functional as well as aesthetic requirements of the particular application.

The outer skin 42 preferably includes a pre-weakened seam 46 formed a on the inner surface of the outer skin 42 opposite the interior of the vehicle. The seam 46 is formed in a generally U-shape to fall immediately over the door panel 24 such that when the air bag 16 is deployed, and the door panel 24 is forced open, the outer skin 42 will tear along the seam 46 to allow the door panel 24 to pivot outward through the outer skin 42 to the open position. The pre-weakened seam 46 can be formed in the skin 42 by laser scoring, mechanical scoring, molded in groove or any other suitable method.

Preferably, the door portion 32 of the door panel 24 further includes an upstanding flange 47 extending along the two side edges 30 and the bottom edge 28. The upstanding flange 47 extends outward from the door portion 32 of the door panel 24 to provide a cutting edge to assist the door portion 32 in breaking through the outer skin 42 and foam 44 structure of the instrument panel 10. The cutting edge will provide a cleaner cut of the outer skin 42 and the foam 44 when the air bag 16 deploys.

When the instrument panel 10 is formed, the foam 44 between the substrate 12 and the outer skin 42 is typically injected as a liquid which then cures to a solid foam. In prior art instrument panels it is typical to include a seal or gasket disposed between the door panel 24 and the substrate 12 to fill the gap 50 therebetween and prevent the liquid foam 44 from leaking into the air bag module 18 prior to hardening. Use of the adhesive tape 40 as described above will provide a seal between the door panel 24 and the substrate 12 and eliminate the need for a seal or gasket.

Prior to assembly, the door panel 24 is formed from a sheet of metal, preferably steel or some other suitable material, and the substrate 12 is formed from a suitable plastic. The outer skin 42 is formed from a suitable material as discussed above, and a pre-weakened seam is formed within the outer skin 42 to provide a controlled fracture point within the outer skin 42. The pre-weakened seam can be formed in the skin 42 by laser scoring, mechanical scoring, molded in groove or any other known method.

Figure 4:
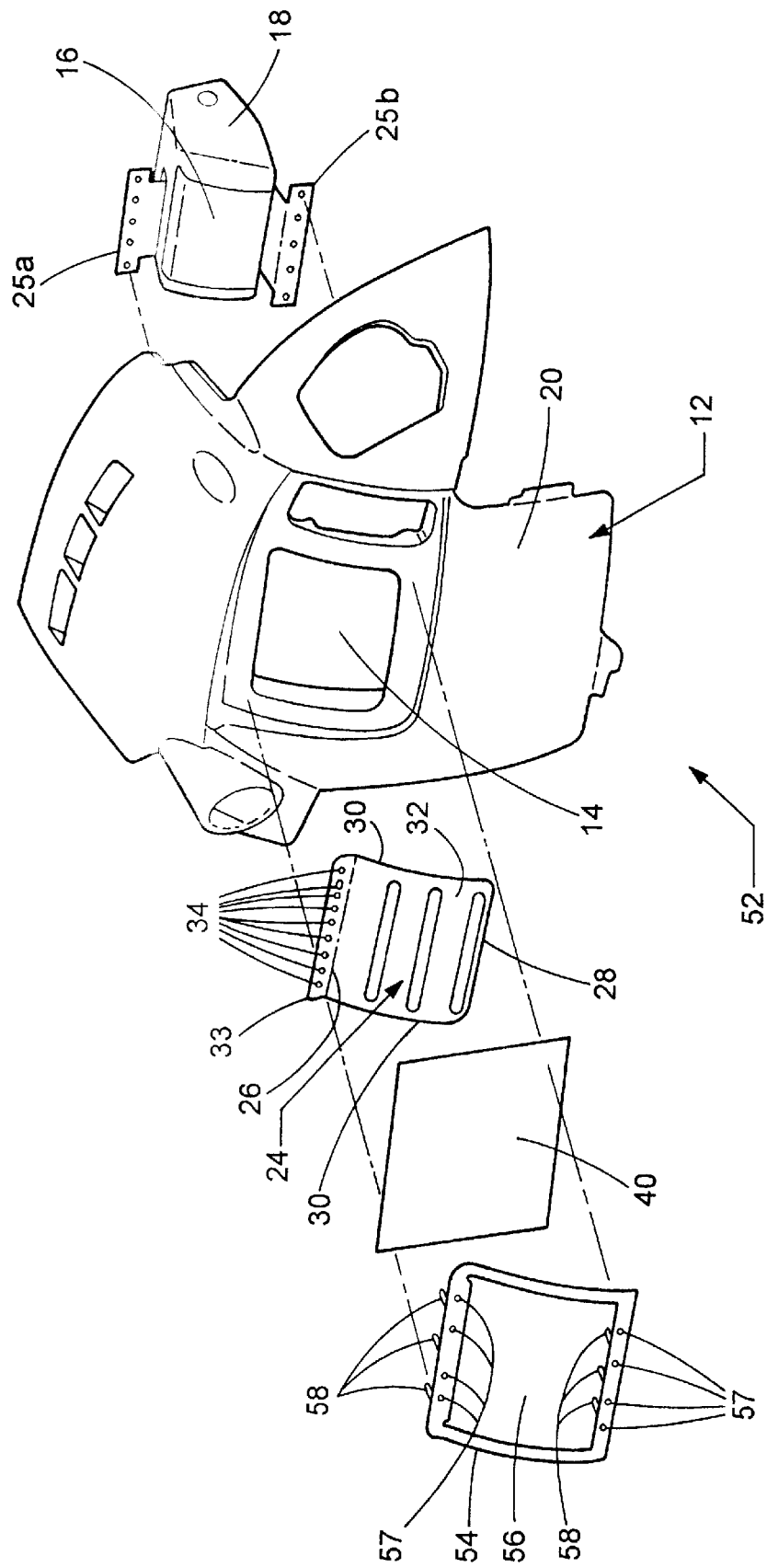
FIG. 4 is an exploded view of a second preferred embodiment of the instrument panel of the present invention.
Figure 5:
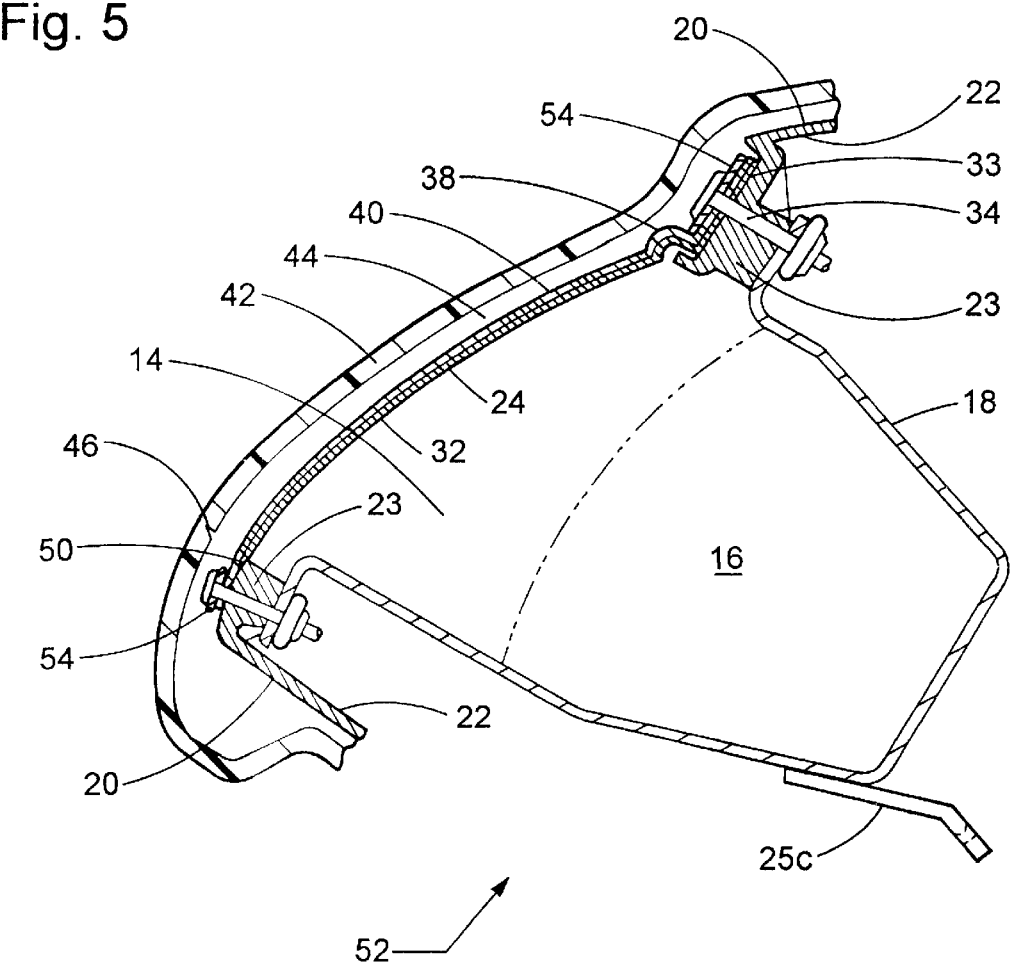
FIG. 5 is a cross-sectional view of the instrument panel shown in FIG. 4.

Referring to FIGS. 4 and 5, a second preferred embodiment 52 of the instrument panel 10 also includes a substrate 12 with an opening 14 therein, a door panel 24 mounted to the substrate 12, an outer skin 42, and a layer of foam 44 between the outer skin 42 and the substrate 12. The second preferred embodiment 52 also includes a layer of adhesive tape 40 covering the door panel 24 and extending over onto portions of the substrate 12. The second preferred embodiment 52, however, further includes a compression frame 54 mounted to the substrate 12 and surrounding the opening 14 therein.

The compression frame 54 is preferably made from steel or a similarly rigid material. The compression frame 54 is generally shaped to extend around the opening 14 within the substrate 12 and includes an opening 56 that is preferably substantially the same size as the opening 14 within the substrate 12. The compression frame 54 preferably includes apertures 57 adapted to allow the compression frame to be attached to the substrate 12 by mechanical fasteners extending around the opening 56. The compression frame 54 further includes welded studs 58 adapted to allow the air bag module 18 to be mounted to the compression frame 54 by mechanical fasteners. Preferably, mechanical fasteners are inserted through apertures within the brackets 25 on the air bag module 18, extending through the substrate 12 and the hinge portion 33 of the door panel 24 and engaging the welded studs of the compression frame 54. The hinge portion 33 of the door panel 24 includes apertures to allow the mechanical fasteners that attach the air bag module 18 to the compression frame 54 to extend therethrough. In this way, the air bag module 18 is mounted securely to the rigid compression frame 54 with the hinge portion 33 of the door panel 24, the adhesive tape 40, and the substrate 12 captured therebetween. The purpose of the compression frame 54 is to provide additional support to the instrument panel 52. Additionally, the compression frame 54 assists in securing the adhesive tape 40 to the substrate 12.

The foregoing discussion discloses and describes two preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. An instrument panel for an automobile passenger compartment comprising;
   a substrate including an interior surface, an exterior surface, and an opening therethrough;
   an air bag module mounted to said interior surface;
   a ridge molded into and extending from said interior surface and around said opening, said ridge providing molded-in bosses supporting and securing said air bag module on said interior surface; and
   a door panel adapted to cover said opening, said door panel pivotally connected to said exterior surface by a hinge portion, said door panel including an upstanding flange extending around at least a portion of said door panel.

2. The instrument panel of claim 1 further including adhesive tape affixed to said door panel and to portions of said exterior surface to secure said door panel in a closed position and to form a sealed engagement between a periphery of said door panel and said substrate.

3. The instrument panel as set forth in claim 1 wherein said air bag module includes a plurality of mounting brackets adapted to mount said air bag module to said substrate and to mount said air bag module to a support structure within the automobile, thereby providing attachment of the substrate back to the support structure of the vehicle through said air bag module.

4. The instrument panel as set forth in claim 3 wherein said air bad module includes a front end, a rear end, side walls, side mounting brackets adapted for attachment to said substrate, and a rear mounting bracket extending from said rear end and adapted to attach to the support structure of the automobile.

5. The instrument panel as set forth in claim 1 wherein said door panel includes a hinge portion and a door portion, said hinge portion including apertures adapted to receive fasteners to attach said hinge portion to said exterior surface and said door portion pivotally attached to said hinge portion, said upstanding flange extending along said peripheral edge of said door portion.

6. The instrument panel as set forth in claim 2 further including a compression frame mounted to said exterior surface over said adhesive tape, said compression frame surrounding said door panel to firmly secure said adhesive tape to said exterior surface and to support said portion of substrate immediately surrounding said opening.

7. The instrument panel as set forth in claim 6 wherein said door panel and said compression frame are formed from metal and said substrate is formed from plastic.

8. The instrument panel as set forth in claim 7 wherein said hinge portion of said door panel is disposed between said compression frame and said exterior surface of said substrate.

9. The instrument panel as set forth in claim 8, wherein said compression frame includes apertures for receiving fasteners to secure said compression frame to said substrate and welded studs adapted to attach said compression frame to an air bag module.

10. The instrument panel as set forth in claim 1, including a skin covering extending over said substrate.

11. The instrument panel as set forth in claim 10, wherein said skin includes a pre-weakened pattern outlining the location of said opening within said substrate, said pre-weakened pattern providing a break point to allow a controlled portion of said skin immediately over said door panel to break away upon deployment of an air bag device, said skin providing no external indicia of the air bag device located beneath.

12. The instrument panel as set forth in claim 11, including a foam between said skin covering and said substrate.

* * * * *

UNITED STATES PATENT AND TRADEMARK OFFICE
CERTIFICATE OF CORRECTION

PATENT NO. : 6,644,685 B2
DATED : November 11, 2003
INVENTOR(S) : Esther M. Sun et al.

It is certified that error appears in the above-identified patent and that said Letters Patent is hereby corrected as shown below:

Column 5,
Line 29, after "said air" delete "bad" and substitute -- bag -- in its place.

Signed and Sealed this

Eighth Day of June, 2004

JON W. DUDAS
*Acting Director of the United States Patent and Trademark Office*